Figure 1:
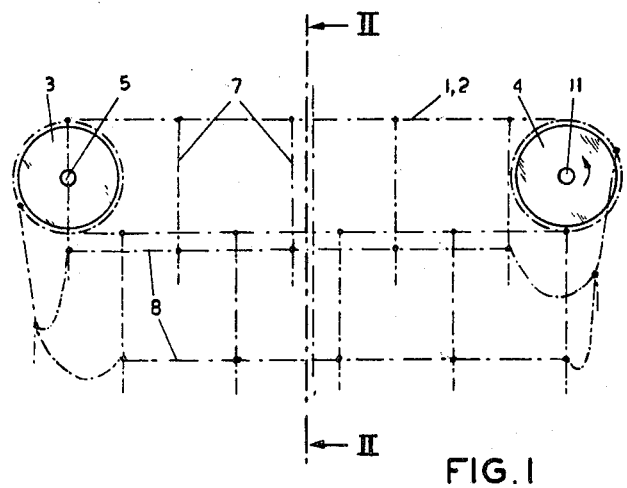

Dec. 15, 1964   J. DE KONING   3,161,281
CONVEYORS

Filed July 23, 1962   2 Sheets-Sheet 1

INVENTOR
JAN DE KONING

BY *Imirie and Smiley*

ATTORNEYS

Dec. 15, 1964  J. DE KONING  3,161,281
CONVEYORS
Filed July 23, 1962  2 Sheets-Sheet 2
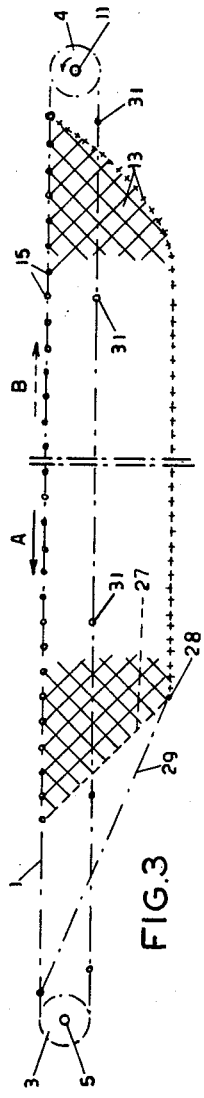
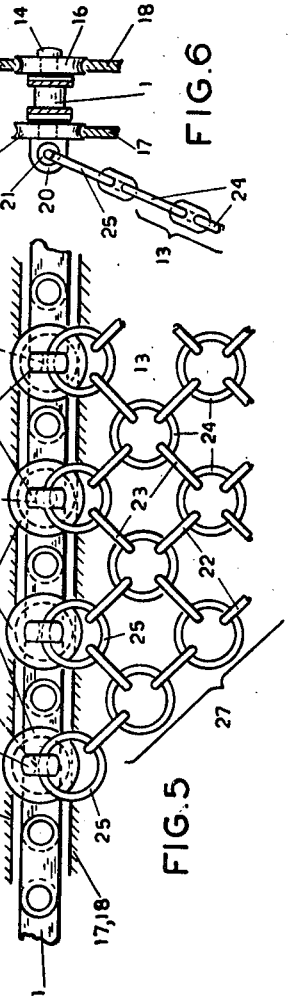
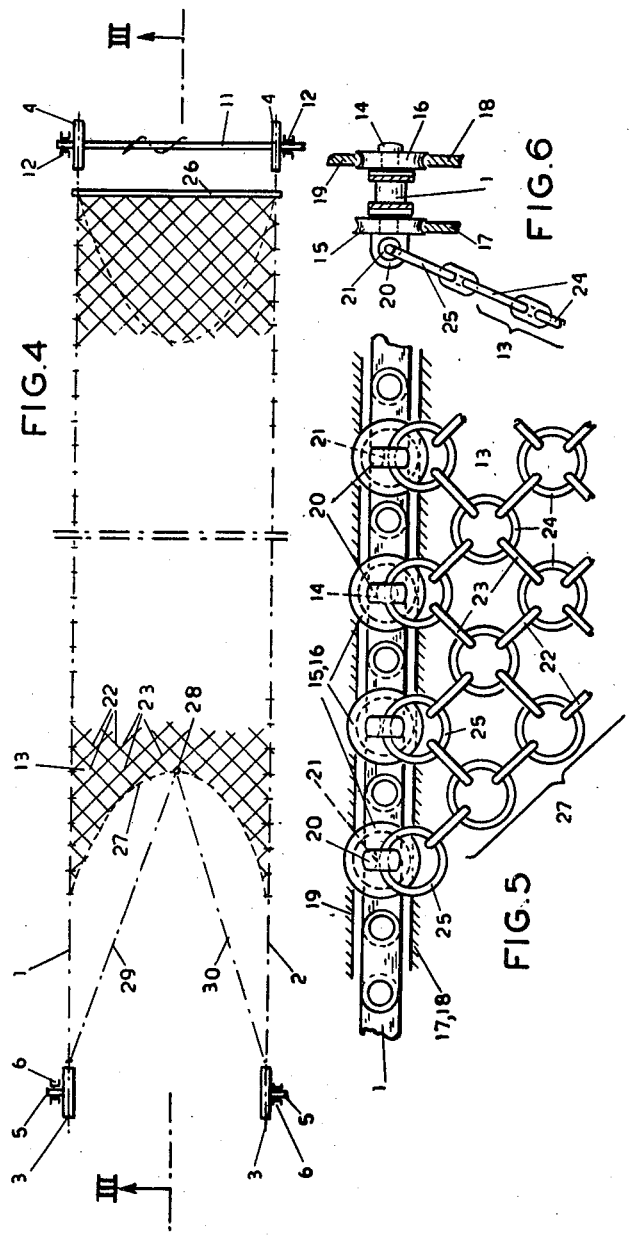
INVENTOR
JAN DE KONING
BY  *Imirie and Smiley*
ATTORNEYS

United States Patent Office 3,161,281
Patented Dec. 15, 1964

3,161,281
CONVEYORS
Jan de Koning, Amsterdam, Netherlands, assignor to N.V. Ingenieursbureau voor Systemen en Octrooien Spanstaal, Rotterdam, Netherlands, a company of the Netherlands
Filed July 23, 1962, Ser. No. 211,582
Claims priority, application Netherlands, July 25, 1961, 267,511; Aug. 11, 1961, 268,111, 268,112
7 Claims. (Cl. 198—153)

The invention relates to a conveyor consisting of at least two spaced apart substantially parallel endless conveying members, which are led over guiding members, such as wheels or other guiding means.

Conveyors of this kind are known per se. These known conveyors have the disadvantages that they are not well adapted to the transport, the loading and the discharging of relatively heavy bulk goods, such as concrete blocks or natural stones having weights of several tons and that they permit the storage of only relatively small quantities of goods per running meter. For instance the storage capacity of the well known rubber conveying belts is about 1.5 tons/meter, which is often too little, especially when the conveying belt must be used at the same time as a storage means for large quantities of materials. In the latter case it is often necessary to use bunkers together with the known conveying belts which, however, cause difficulties due to the phenomenon of bridge building therein. Further the goods can only be deposited on the known conveying belts on one single spot, which for instance is resiliently supported.

The invention has for its object to provide a conveyor, in which the disadvantages referred to are avoided. It consists in that a relatively slack net for the carrying of the goods to be transported is suspended by said conveying members and extends between the latter members. Due to the fact that the net is relatively slack the load of a heavy body is distributed over a large area of the net. The discharge or dumping of the transported goods is facilitated owing to the fact that the discharge end of the conveyor is drawn in the shape of a torus. The conveyor according to the invention is particularly adapted to convey concrete blocks or natural stones of any shape having weights of several tons and it can be constructed in a rather simple manner. Said conveyor has further a great storage capacity per running meter, say a storage capacity of 20 tons/meter, so that the conveyor may be used for storing a large quantity of goods and the bunker, giving so many difficulties, may be dispensed with. Moreover it is possible to deposit the goods on the conveyor throughout its entire length without the necessity of providing special supporting means.

An improvement of the conveyor according to the invention is obtained, when the wires or chains of the net extending between the conveying members intersect or cross each other. In that case a conveyor is obtained which better resists the point loads which for instance occur when the net is loaded with bulk stones having a weight of several tons. This is due to the fact that on both sides of the point loads the wires or chains of the net are stretched tight in triangular areas, of which areas the apices meet in said load point and the bases coincide with portions of the conveying members. In this improved embodiment of the invention both the wires or chains of the net and the conveying members are charged less heavily than in the embodiment, in which said wires or chains are parallel and transversely directed, respectively, with respect to the longitudinal direction of the conveying members, so that said improved conveyor may be constructed less heavy, and therefore less expensively. Moreover, the net of this improved conveyor is adapted to bend backward more easily in its discharge zone.

It is preferred to constitute the supporting area of the net by chains consisting of ring-shaped links and to provide the intersecting chains with common ring links.

It is advantageous to construct the conveyor in such a manner that the net has a length substantially equal to the length of the parts of the conveying members extending between the guiding members. In that case a rather cheap conveyor is obtained, onto which a large quantity of heavy bulk goods can be stored and from which the bulk goods can be quickly discharged at any desired time.

If one end of the net is suspended by a cross beam extending between and attached to the guiding members, the length of the net required for a predetermined charge may be made smaller, so that the length of the conveyor may be reduced. If in that case cables or like means are connected with their one ends to the free hanging leading edge of the net with their other ends to remote points of the conveying members, a very satisfactory bending of the discharging zone of the net during the dumping of the goods is guaranteed.

It is preferred to construct the guiding members as roller chains, of which the rollers are provided on both sides of the chains at certain distances from one another and are supported and guided by rails. In this arrangement the distance between two consecutive rollers may be advantageously made at least equal to twice the length of the links of the conveying chains. In order to take up well the cross moment of torsion a construction is recommended, in which the rollers provided on the side of the conveying chains facing the net are only supported by rails mounted underneath said rollers and the rollers provided on the side of the conveying chains remote from the net are both supported by rails mounted underneath and guided by rails mounted above said rollers.

Figure 2:
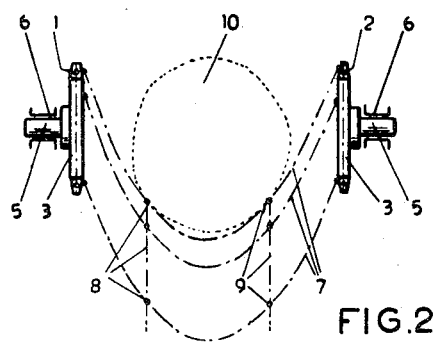

The invention will be further elucidated with the aid of the accompanying drawing illustrating diagrammatically by way of example several embodiments of the invention. In the drawing:

FIG. 1 is a diagrammatical elevational view of a first embodiment of a conveyor according to the invention, FIG. 2 is a cross-sectional view taken on the line II—II in FIG. 1, FIG. 3 is a longitudinal sectional view of a second embodiment of the conveyor according to the invention, FIG. 4 is a plan view of the conveyor shown in FIG. 3, FIG. 5 is a portion of a net for the conveyor illustrated in FIGS. 3 and 4, and FIG. 6 is a cross-sectional view of one of the guiding members of a conveyor according to the invention.

In FIGS. 1 and 2 of the drawing two endless guiding members 1 and 2 constructed as chains are led over sprocket wheels 3 and 4, of which wheels the wheels 4 are driven in the direction of the arrow by a not-shown driving mechanism. Preferably the guiding chains are roller chains. The shafts 5 of the sprocket wheels are supported in a frame (not shown) by bearings 6. Suspended by the guiding chains 1 and 2 are cross chains 7 and provided in the space between the guiding chains are chains 8 and 9 which extend parallel to said guiding chains and are secured to the cross chains. The longitudinal chains and the cross chains constitute together a relatively slack net, which is suspended between the guiding chains. Instead of chains other supporting members, such as wires, may be used for the net. If the net is made sufficiently strong the conveyor according to the invention is particularly adapted to convey heavy bodies 10 of any given shape, such as natural stones. If a relatively heavy body comes to lie onto the conveyor during loading the same the net will acquire the shape of a triangle.

In the embodiment of the conveyor illustrated in FIGS.

3-6 the chain sprockets 4 are mounted on a common shaft 11 supported in bearings 12 of a frame which is not shown. This shaft 11 is driven by a driving mechanism not illustrated.

The slack net 13 suspended between the roller chains 1 and 2 extends through a length which is about half the length of said chains 1 and 2. In the portions of the chains 1, 2 supporting the net pairs of chain links are interconnected by shafts 14, of which the ends project from said chains. The distance between said shafts 14 is thus twice the length of the links of said chains. These shafts support the rollers 15 and 16 of the roller chains. The rollers 15 provided on the end portions of the shafts 14 closer to the net run on rails 17 mounted underneath said rollers and the rollers mounted on the end portions of the shafts 14 further from the net are both supported by rails 18 mounted underneath said rollers and guided by rails 19 provided above said rollers. Said shafts 14 are further provided at their ends facing the net with eyes 20 having each an aperture 21.

Suspended between the roller chains 1 and 2 are chains 22 and 23 consisting of ring-shaped links. These chains 22 and 23 constituting the net intersect at angles of about 90° and enclose together with the roller chains 1 and 2 angles of about 45°. The chains 22, 23 of the net are provided at their intersecting points with ring links 24 and the common end links or end rings 25 are passed through the apertures 21 of the eyes 20. The right hand edge of the net 13 is suspended by the common end links on a cross beam 26 which is connected to the roller chains 1 and 2. Two cables 29 and 30 are connected to the center 28 of the free hanging leading edge 27 of the net 13. The other ends of said cables are connected to remote points of the roller chains 1, 2.

The net 13 of the described conveyor is adapted to be loaded with bulk stones having weights of several tons. After the net has been loaded it is moved in the direction of the arrow A by driving the roller chains 1, 2. Thereby the point 28 of the net is bent back as soon as the net has reached the chain sprockets 3 and the bulk goods supported by the net are dumped from the net in the vicinity of said sprockets 3. During further movement of the net in the direction of the arrow A the discharged portion of the net is moved between the lower portions of the roller chains 1 and 2 in opposite direction. The cables 29 and 30 keep the empty portion of the net stretched tight and guarantee a satisfactory bending of the discharging zone of the net. After the net has been emptied the upper portions, or runs, of the roller chains 1 and 2 are moved back along lower runs in line with the lower edges of sockets 3 and 4 in the direction of the arrow B. Thereafter the net is ready to be charged again.

The portions of the conveying members 1 and 2 which are not connected to the net 13 may be provided with rollers 31 lying at greater distances than the rollers of the portions of the guiding members to which the chains of the net 13 are connected.

The net of chains used in a conveyor according to the invention can easily be constructed for loads of about 20 tons per running meter.

It is observed that the invention is not restricted to the described embodiments and that within the scope of the invention many variants are possible.

What I claim is:

1. A conveyor comprising at least two spaced apart substantially parallel endless movable conveying members, guiding members, said conveying members being supported and guided by said guiding members, rollers rotatably mounted in said conveying members, rails forming part of said guiding members for supporting said rollers, a relatively slack net having a free hanging leading edge suspended by and between said conveying members for carrying the material to be transported, said net including slack elongated supporting members suspended as to form chain lines, the ends of said chain lines being connected to the two spaced apart conveying members at points close to said rollers and forming the sole means for supporting the net from the conveying members, and a plurality of cables, each cable being attached at one end to the free hanging leading edge of the net and at the other end to a remote point of one of the conveying members.

2. A conveyor comprising at least two horizontally spaced and substantially vertically disposed endless movable conveying members having upper and lower runs, guiding members supporting and guiding said conveying members, closely spaced rollers rotatably mounted in said conveying members, rails forming part of said guiding members for supporting said rollers, and a single, flexible net suspended directly from and between said conveying members for carrying material of large size and odd shapes to be transported, said net depending between said conveying members to form an elongated, curved trough having a depth at least equal to the vertical distance between said upper and lower runs, said net being formed by chain-like supporting members whose ends are connected to the two spaced apart conveying members at points close to said rollers as the sole means for supporting the net.

3. A conveyor according to claim 2 wherein said net has a free hanging leading edge formed in the shape of a torus and a trailing edge which is fastened to a crossbeam connected to said conveying members.

4. A conveyor as claimed in claim 2, in which the supporting members extending between the conveying members intersect each other, said supporting members defining acute angles with the endless conveying members at their points of connection.

5. A conveyor as claimed in claim 2, in which the net has a length of about half the length of the conveying members.

6. A conveyor as claimed in claim 2, in which the conveying members are roller chains, in which said rollers are provided on both sides of each chain and spaced at certain distances from one another longitudinally of the chain, said rollers being supported and guided by rails.

7. A conveyor as claimed in claim 6, in which the rollers provided on the side of each conveying chain facing the net are only supported by rails mounted underneath them and the rollers provided on the side of each conveying chain remote from the net are both supported by rails mounted underneath and guided by rails mounted above them.

References Cited by the Examiner

UNITED STATES PATENTS

| 1,559,772 | 11/25 | Peale | 198—194 |
| 1,673,527 | 6/28 | Peiler | 198—193 X |
| 2,278,361 | 3/42 | Rapisarda | 198—194 |
| 3,076,996 | 2/63 | Schmidt | 17—1 |

FOREIGN PATENTS

| 73,121 | 9/51 | Denmark. |
| 778,687 | 1/35 | France. |
| 135,398 | 6/60 | Russia. |

SAMUEL F. COLEMAN, *Acting Primary Examiner.*

WILLIAM B. LA BORDE, ERNEST A. FALLER, Jr.
*Examiners.*